(12) United States Patent (10) Patent No.: US 8,937,883 B2
Wakui et al. (45) Date of Patent: Jan. 20, 2015

(54) COMMUNICATION SYSTEM, COMMUNICATION CONTROL DEVICE, COMMUNICATION METHOD, AND MOBILE DEVICE

(75) Inventors: Michiko Wakui, Chiyoda-ku (JP); Hisayuki Aso, Chiyoda-ku (JP); Naohiro Sekiya, Chiyoda-ku (JP)

(73) Assignee: NTT DoCoMo, Inc., Tokyo (JP)

( * ) Notice: Subject to any disclaimer, the term of this patent is extended or adjusted under 35 U.S.C. 154(b) by 83 days.

(21) Appl. No.: 13/700,530

(22) PCT Filed: Dec. 22, 2011

(86) PCT No.: PCT/JP2011/079888
§ 371 (c)(1),
(2), (4) Date: Nov. 28, 2012

(87) PCT Pub. No.: WO2012/086787
PCT Pub. Date: Jun. 28, 2012

(65) Prior Publication Data
US 2013/0070633 A1 Mar. 21, 2013

(30) Foreign Application Priority Data
Dec. 24, 2010 (JP) .................................. 2010-288792

(51) Int. Cl.
*H04W 24/10* (2009.01)
*H04M 15/00* (2006.01)
(Continued)

(52) U.S. Cl.
CPC ........... *H04W 24/10* (2013.01); *H04L 12/1467* (2013.01); *H04L 12/1439* (2013.01);
(Continued)

(58) Field of Classification Search
CPC ................. H04W 88/08; H04L 45/02; H04L 2012/5631; H04L 41/5022; H04L 41/5087; H04L 43/0811; H04L 45/556; H04L 47/2441
USPC ................. 370/405, 406, 408, 409, 328, 338; 455/406, 436, 405
See application file for complete search history.

(56) References Cited

U.S. PATENT DOCUMENTS 6,829,339 B1 * 12/2004 Kunugi et al. ........... 379/114.17
2007/0066304 A1 * 3/2007 Lee ............................ 455/436
2008/0176531 A1 * 7/2008 Komatsu ..................... 455/406

FOREIGN PATENT DOCUMENTS

JP  2005 204323  7/2005
WO  WO 2004/079542 A2  9/2004

OTHER PUBLICATIONS

International Search Report Issued Jan. 31, 2012 in PCT/JP11/79888 Filed Dec. 22, 2011.
(Continued)

*Primary Examiner* — Charles C Jiang
*Assistant Examiner* — Will Lin
(74) *Attorney, Agent, or Firm* — Oblon, Spivak, McClelland, Maier & Neustadt, L.L.P.

(57) ABSTRACT

During communication by a mobile device, when a communication feasibility determining unit of an SGSN determines, based on a remaining communication volume, that the communication by the mobile device cannot be continued, an access point information extracting unit extracts APN information regarding an APN with an unused remaining communication volume and reports the extracted APN information to the mobile device. An access point information acquiring unit of the mobile device acquires APN information regarding the APN with an unused remaining communication volume. When communication is next initiated, the APN information regarding the APN with an unused remaining communication volume is transmitted to the SGSN to perform communication.

17 Claims, 11 Drawing Sheets

(51) Int. Cl.
*H04W 28/02* (2009.01)
*H04M 17/02* (2006.01)
*H04L 12/14* (2006.01)

(52) U.S. Cl.
CPC ......... *H04L12/1435* (2013.01); *H04M 15/854* (2013.01); *H04M 15/85* (2013.01); *H04M 15/83* (2013.01); *H04W 28/02* (2013.01); *H04M 2215/204* (2013.01); *H04M 17/02* (2013.01)
USPC ........................................................ 370/252

(56) References Cited

OTHER PUBLICATIONS

International Preliminary Report on Patentability Issued Jul. 2, 2013 in PCT/JP2011/079888 (English translation only).
Written Opinion of the International Searching Authority Issued Jan. 31, 2012 in PCT/JP2011/079888 (English translation only).
Extended Search Report issued Nov. 17, 2014 in EP Application No. 11852086.5-1855/2658236 PCT/JP2011079888, 12 pages.

\* cited by examiner

Fig.2

| IDENTIFICATION INFORMATION | APN INFORMATION | REMAINING COMMUNICATION VOLUME |
|---|---|---|
| A001 | APN_#1 | 10 |
| A001 | APN_#2 | 0 |
| A001 | APN_#3 | 20 |
| A002 | APN_#2 | 5 |
| A002 | APN_#4 | 10 |
| ... | ... | ... |

COMMUNICATION SYSTEM, COMMUNICATION CONTROL DEVICE, COMMUNICATION METHOD, AND MOBILE DEVICE

TECHNICAL FIELD

The present invention relates to a communication system for controlling communication by a mobile device, a communication control device and a mobile device used in the communication system, and a communication method for controlling communication by a mobile device.

BACKGROUND ART

Conventionally, there are communication systems that perform data communication between mobile devices using a GPRS (General Packet Radio Service). Such a communication system is provided with a GGSN (Gateway GPRS Support Node) for connecting different networks, a plurality of SGSNs (Service GPRS Support Nodes) arranged subordinate to the GGSN, and the like, and a mobile device is connected to a network that is an access point via the SGSN and GGSN. Meanwhile, there are communication services in which a communication access fee is paid in advance and communication by a mobile device is enabled within the limit of the paid amount through the use of so-called prepaid mobile devices. Patent Literature 1 describes an example of a prepaid mobile device being applied to a communication system using GPRS.

CITATION LIST

Patent Literature

Patent Literature 1: Japanese Patent Application Laid-open No. 2005-204323

Generally, when controlling communication by a prepaid mobile device in a communication system using GPRS, a remaining communication volume which can be used for communication by a mobile device is conceivably managed for each APN (Access Point Name) when the mobile device connects to a communication network. Since a remaining communication volume of each APN is managed by a device other than the mobile device, a user of the mobile device (a subscriber of the mobile device) may not be aware of the remaining communication volume of each APN. In this case, problems arise including an inconvenience that despite the availability of an APN with an unused remaining communication volume, a user of a mobile device is unable to communicate through the APN.

SUMMARY OF INVENTION

Technical Problem

In consideration thereof, an object of the present invention is to provide a communication system, a communication control device, a communication method, and a mobile device capable of performing communication connections with greater convenience.

Solution to Problem

To this end, the present invention is a communication system configured to include: a communication control device which acquires, from a mobile device, access point information indicating an access point that is accessed when connecting to a communication network and which controls communication by the mobile device based on the access point information; and a remaining communication volume storage device which stores a remaining communication volume that can be used by the mobile device to communicate through the access point indicated by the access point information in association with identification information capable of identifying a subscriber who uses the mobile device, wherein the communication control device includes: identification information acquiring means for acquiring the identification information and the access point information from the mobile device; remaining communication volume acquiring means for acquiring, based on the identification information and the access point information acquired by the identification information acquiring means, a remaining communication volume of the mobile device corresponding to the identification information and the access point information; communication volume measuring means for measuring a communication volume from a start of communication by the mobile device; remaining communication volume calculating means for calculating a remaining communication volume that can be used for communication by the mobile device based on the remaining communication volume acquired by the remaining communication volume acquiring means and the communication volume measured by the communication volume measuring means; communication feasibility determining means for determining whether or not communication by the mobile device can be continued based on the remaining communication volume calculated by the remaining communication volume calculating means; access point information extracting means for extracting access point information regarding an access point with an unused remaining communication volume when the communication feasibility determining means determines that communication by the mobile device cannot be continued; and access point information reporting means for reporting the access point information extracted by the access point information extracting means to the mobile device, and the mobile device includes: access point information acquiring means for acquiring the access point information reported from the access point information reporting means; and access point information transmitting means for transmitting the access point information acquired by the access point information acquiring means to the communication control device upon initiating a communication connection to the communication network.

In addition, the present invention is a communication control device which acquires, from a mobile device, access point information indicating an access point that is accessed when connecting to a communication network and which controls communication by the mobile device based on the access point information, wherein the communication control device comprises: identification information acquiring means for acquiring, from the mobile device, identification information capable of identifying a subscriber who uses the mobile device and access point information; remaining communication volume acquiring means for acquiring, based on the identification information and the access point information acquired by the identification information acquiring means, a remaining communication volume that can be used by the mobile device to communicate through the access point indicated by the access point information; communication volume measuring means for measuring a communication volume from a start of communication by the mobile device; remaining communication volume calculating means for calculating a remaining communication volume that can be used for communication by the mobile device based on the remaining communication volume acquired by the remaining communication volume acquiring means and the communication volume measured by the communication volume measuring means; communication feasibility determining means for determining whether or not communication by the mobile device can be continued based on the remaining communication volume calculated by the remaining communication volume calculating means; access point information extracting means for extracting access point information regarding an access point with an unused remaining communication volume when the communication feasibility determining means determines that communication by the mobile device cannot be continued; and access point information reporting means for reporting the access point information extracted by the access point information extracting means to the mobile device.

Furthermore, the present invention is a communication method that is executed by a communication system configured to include: a communication control device which acquires, from a mobile device, access point information indicating an access point that is accessed when connecting to a communication network and which controls communication by the mobile device based on the access point information; and a remaining communication volume storage device which stores a remaining communication volume that can be used by the mobile device to communicate through the access point indicated by the access point information in association with identification information capable of identifying a subscriber who uses the mobile device, wherein the communication method comprises: an identification information acquiring step in which the communication control device acquires the identification information and the access point information from the mobile device; a remaining communication volume acquiring step in which the communication control device acquires, based on the identification information and the access point information acquired in the identification information acquiring step, a remaining communication volume of the mobile device corresponding to the identification information and the access point information; a communication volume measuring step in which the communication control device measures a communication volume from a start of communication by the mobile device; a remaining communication volume calculating step in which the communication control device calculates a remaining communication volume that can be used for communication by the mobile device based on the remaining communication volume acquired in the remaining communication volume acquiring step and the communication volume measured in the communication volume measuring step; a communication feasibility determining step in which the communication control device determines whether or not communication by the mobile device can be continued based on the remaining communication volume calculated in the remaining communication volume calculating step; an access point information extracting step in which the communication control device extracts access point information regarding an access point with an unused remaining communication volume when it is determined in the communication feasibility determining step that communication by the mobile device cannot be continued; an access point information reporting step in which the communication control device reports the access point information extracted in the access point information extracting step to the mobile device; an access point information acquiring step in which the mobile device acquires the access point information reported in the access point information reporting step; and an access point information transmitting step in which the mobile device transmits the access point information acquired in the access point information acquiring step to the communication control device upon initiating a communication connection to the communication network.

In the inventions described above, during communication by a mobile device, when it is determined based on a remaining communication volume that the communication by the mobile device cannot be continued, access point information regarding an access point with an unused remaining communication volume is extracted and the extracted access point information is reported to the mobile device. The mobile device acquires information regarding the access point with an unused remaining communication volume, and performs communication by transmitting the information regarding the access point with an unused remaining communication volume to the communication control device upon initiating communication. In this manner, since information regarding an access point with an unused remaining communication volume is comprehended by the mobile device and the mobile device can perform communication based on the information regarding the access point with an unused remaining communication volume, a communication connection with greater convenience can be performed.

In addition, favorably, the access point information extracting means extracts a plurality of pieces of access point information, the access point information reporting means reports the plurality of pieces of access point information extracted by the access point information extracting means to the mobile device, the mobile device further includes access point information selecting means for selecting access point information that satisfies predetermined conditions from the plurality of pieces of access point information acquired by the access point information acquiring means, and the access point information transmitting means transmits the access point information selected by the access point information selecting means to the communication control device. In this case, since communication can be performed based on access point information that satisfies predetermined conditions among a plurality of pieces of access point information, a communication connection based on more favorable access point information can be performed.

Furthermore, favorably, the mobile device further includes priority order storing means for storing a plurality of pieces of access point information and a priority order applied when connecting to access points indicated by the respective pieces of access point information in association with each other, and the access point information selecting means selects access point information with a highest priority order among the plurality of pieces of access point information acquired by the access point information acquiring means, based on the priority order stored in the priority order storing means. In this case, access point information can be readily selected from a plurality of pieces of access point information based on a priority order associated to each piece of access point information in advance.

In addition, favorably, the access point information reporting means adds a priority order to the plurality of pieces of access point information extracted by the access point information extracting means and reports the plurality of pieces of access point information added with the priority order to the mobile device, and the access point information selecting means selects access point information based on the priority order added to the access point information. In this case, the access point information selecting means can select access point information based on the priority order reported from the access point information reporting means.

Furthermore, favorably, the access point information reporting means adds, to each of the plurality of pieces of access point information extracted by the access point information extracting means, a remaining communication volume corresponding to each piece of access point information and reports the plurality of pieces of access point information added with the remaining communication volumes to the mobile device, and the access point information selecting means selects access point information based on the remaining communication volumes added to the access point information. In this case, the access point information selecting means can select access point information based on the remaining communication volumes.

In addition, favorably, upon selection of access point information from the plurality of pieces of access point information, the access point information selecting means causes an application program that had initiated communication in the mobile device or a user of the mobile device to select the access point information. In this case, since an application program that had initiated communication or a user of the mobile device is able to select access point information, convenience can be improved.

Furthermore, the present invention is a communication system configured to include: a communication control device which acquires, from a mobile device, access point information indicating an access point that is accessed when connecting to a communication network and which controls communication by the mobile device based on the access point information; and a remaining communication volume storage device which stores a remaining communication volume that can be used by the mobile device to communicate through the access point indicated by the access point information in association with identification information capable of identifying a subscriber who uses the mobile device, wherein the communication control device includes: identification information acquiring means for acquiring the identification information and the access point information from the mobile device having made an initiation request for a communication connection; remaining communication volume acquiring means for acquiring, based on the identification information and the access point information acquired by the identification information acquiring means, a remaining communication volume of the mobile device which corresponds to the identification information and the access point information: communication feasibility determining means for determining whether or not a communication connection by the mobile device can be performed based on the remaining communication volume acquired by the remaining communication volume acquiring means: access point information extracting means for extracting access point information regarding an access point with an unused remaining communication volume when the communication feasibility determining means determines that the communication connection by the mobile device cannot be performed; and communication connecting means for performing a communication connection of the mobile device based on the access point information extracted by the access point information extracting means.

In addition, the present invention is a communication control device which acquires, from a mobile device, access point information indicating an access point that is accessed when connecting to a communication network and which controls communication by the mobile device based on the access point information, wherein the communication control device comprises: identification information acquiring means for acquiring identification information capable of identifying a subscriber who uses the mobile device and access point information from the mobile device having made an initiation request for a communication connection; remaining communication volume acquiring means for acquiring, based on the identification information and the access point information acquired by the identification information acquiring means, a remaining communication volume which can be used by the mobile device to communicate through the access point indicated by the access point information; communication feasibility determining means for determining whether or not a communication connection by the mobile device can be performed based on the remaining communication volume acquired by the remaining communication volume acquiring means; access point information extracting means for extracting access point information regarding an access point with an unused remaining communication volume when the communication feasibility determining means determines that the communication connection by the mobile device cannot be performed; and communication connecting means for performing a communication connection of the mobile device based on the access point information extracted by the access point information extracting means.

Furthermore, the present invention is a communication method that is executed by a communication system configured to include: a communication control device which acquires, from a mobile device, access point information indicating an access point that is accessed when connecting to a communication network and which controls communication by the mobile device based on the access point information; and a remaining communication volume storage device which stores a remaining communication volume that can be used by the mobile device to communicate through the access point indicated by the access point information in association with identification information capable of identifying a subscriber who uses the mobile device, wherein the communication method comprises: an identification information acquiring step in which the communication control device acquires the identification information and the access point information from the mobile device having made an initiation request for a communication connection; a remaining communication volume acquiring step in which the communication control device acquires, based on the identification information and the access point information acquired in the identification information acquiring step, a remaining communication volume of the mobile device which corresponds to the identification information and the access point information; a communication feasibility determining step in which the communication control device determines whether or not a communication connection by the mobile device can be performed based on the remaining communication volume acquired in the remaining communication volume acquiring step; an access point information extracting step in which the communication control device extracts access point information regarding an access point with an unused remaining communication volume when it is determined in the communication feasibility determining step that the communication connection by the mobile device cannot be performed; and a communication connection step in which the communication control device performs a communication connection of the mobile device based on the access point information extracted in the access point information extracting step.

In the inventions described above, when it is determined at the start of communication by a mobile device that the communication by the mobile device cannot be continued based on a remaining communication volume, access point information regarding an access point with an unused remaining communication volume is extracted and a communication connection of the mobile device is performed based on the extracted access point information. Accordingly, since a communication connection of the mobile device is performed based on access point information regarding an access point with an unused remaining communication volume when a remaining communication volume has been exhausted, an operation for switching to a communication connection based on information regarding an access point with an unused remaining communication volume need not be performed by a user of the mobile device and a communication connection with greater convenience can be performed.

In addition, favorably, the communication control device further includes inquiring means for making an inquiry to a user of the mobile device regarding whether or not a connection may be performed to the access point indicated by the access point information extracted by the access point information extracting means, and the communication connecting means connects the mobile device to the inquired access point based on a result of the inquiry made by the inquiring means. In this case, by performing a communication connection based on the inquiry result, a communication connection that reflects the user's intentions can be performed.

Furthermore, favorably, the communication control device further includes connection result reporting means for reporting access point information which indicates the access point to which the mobile device has been connected by the communication connecting means to the mobile device. In this case, since information regarding the access point to which the mobile device has been connected is reported to the mobile device, the user of the mobile device can be informed of the access point.

In addition, the present invention is a communication system configured to include: a communication control device which acquires, from a mobile device, access point information indicating an access point that is accessed when connecting to a communication network and which controls communication by the mobile device based on the access point information; and a remaining communication volume storage device which stores a remaining communication volume that can be used by the mobile device to communicate through the access point indicated by the access point information in association with identification information capable of identifying a subscriber who uses the mobile device, wherein the communication control device includes: identification information acquiring means for acquiring the identification information and the access point information from the mobile device; remaining communication volume acquiring means for acquiring, based on the identification information and the access point information acquired by the identification information acquiring means, a remaining communication volume of the mobile device corresponding to the identification information and the access point information; communication volume measuring means for measuring a communication volume from a start of communication by the mobile device; remaining communication volume calculating means for calculating a remaining communication volume that can be used for communication by the mobile device based on the remaining communication volume acquired by the remaining communication volume acquiring means and the communication volume measured by the communication volume measuring means; communication feasibility determining means for determining whether or not communication by the mobile device can be continued based on the remaining communication volume calculated by the remaining communication volume calculating means; access point information extracting means for extracting access point information regarding an access point with an unused remaining communication volume when the communication feasibility determining means determines that communication by the mobile device cannot be continued; and communication control device-side reconnecting means for controlling communication by the mobile device based on the access point information extracted by the access point information extracting means.

Furthermore, the present invention is a communication control device which acquires, from a mobile device, access point information indicating an access point that is accessed when connecting to a communication network and which controls communication by the mobile device based on the access point information, wherein the communication control device comprises: identification information acquiring means for acquiring, from the mobile device, identification information capable of identifying a subscriber who uses the mobile device and access point information; remaining communication volume acquiring means for acquiring, based on the identification information and the access point information acquired by the identification information acquiring means, a remaining communication volume that can be used by the mobile device to communicate through the access point indicated by the access point information; communication volume measuring means for measuring a communication volume from a start of communication by the mobile device; remaining communication volume calculating means for calculating a remaining communication volume that can be used for communication by the mobile device based on the remaining communication volume acquired by the remaining communication volume acquiring means and the communication volume measured by the communication volume measuring means; communication feasibility determining means for determining whether or not communication by the mobile device can be continued based on the remaining communication volume calculated by the remaining communication volume calculating means; access point information extracting means for extracting access point information regarding an access point with an unused remaining communication volume when the communication feasibility determining means determines that communication by the mobile device cannot be continued; and communication control device-side reconnecting means for controlling communication by the mobile device based on the access point information extracted by the access point information extracting means.

In addition, the present invention is a communication method that is executed by a communication system configured to include: a communication control device which acquires, from a mobile device, access point information indicating an access point that is accessed when connecting to a communication network and which controls communication by the mobile device based on the access point information; and a remaining communication volume storage device which stores a remaining communication volume that can be used by the mobile device to communicate through the access point indicated by the access point information in association with identification information capable of identifying a subscriber who uses the mobile device, wherein the communication method comprises: an identification information acquiring step in which the communication control device acquires the identification information and the access point information from the mobile device; a remaining communication volume acquiring step in which the communication control device acquires, based on the identification information and the access point information acquired in the identification information acquiring step, a remaining communication volume of the mobile device corresponding to the identification information and the access point information; a communication volume measuring step in which the communication control device measures a communication volume from a start of communication by the mobile device; a remaining communication volume calculating step in which the communication control device calculates a remaining communication volume that can be used for communication by the mobile device based on the remaining communication volume acquired in the remaining communication volume acquiring step and the communication volume measured in the communication volume measuring step; a communication feasibility determining step in which the communication control device determines whether or not communication by the mobile device can be continued based on the remaining communication volume calculated in the remaining communication volume calculating step; an access point information extracting step in which the communication control device extracts access point information regarding an access point with an unused remaining communication volume when it is determined in the communication feasibility determining step that communication by the mobile device cannot be continued; and a communication control device-side reconnecting step in which the communication control device controls communication by the mobile device based on the access point information extracted in the access point information extracting step.

In the inventions described above, when it is determined during communication by a mobile device that the communication by the mobile device cannot be continued based on a remaining communication volume, access point information regarding an access point with an unused remaining communication volume is extracted and communication by the mobile device is controlled based on the extracted access point information. In this manner, since communication can be controlled based on information regarding an access point with an unused remaining communication volume when a remaining communication volume has been exhausted, a communication connection with greater convenience can be performed.

Furthermore, favorably, the communication control device further includes reconnection information reporting means for reporting access point information extracted by the access point information extracting means to the mobile device, and the mobile device further includes mobile device-side reconnecting means for performing a communication connection based on the access point information reported from the reconnection information reporting means. In this case, the mobile device can perform a communication connection based on the access point information reported from the communication control device.

In addition, as a mobile device according to the present invention, the mobile device used in the communication systems described above can be adopted.

Advantageous Effects of Invention

According to the present invention, a communication connection with greater convenience can be performed.

BRIEF DESCRIPTION OF DRAWINGS

FIG. 2 is a diagram showing a specific example of fee management data;

DESCRIPTION OF EMBODIMENTS

Figure 1:
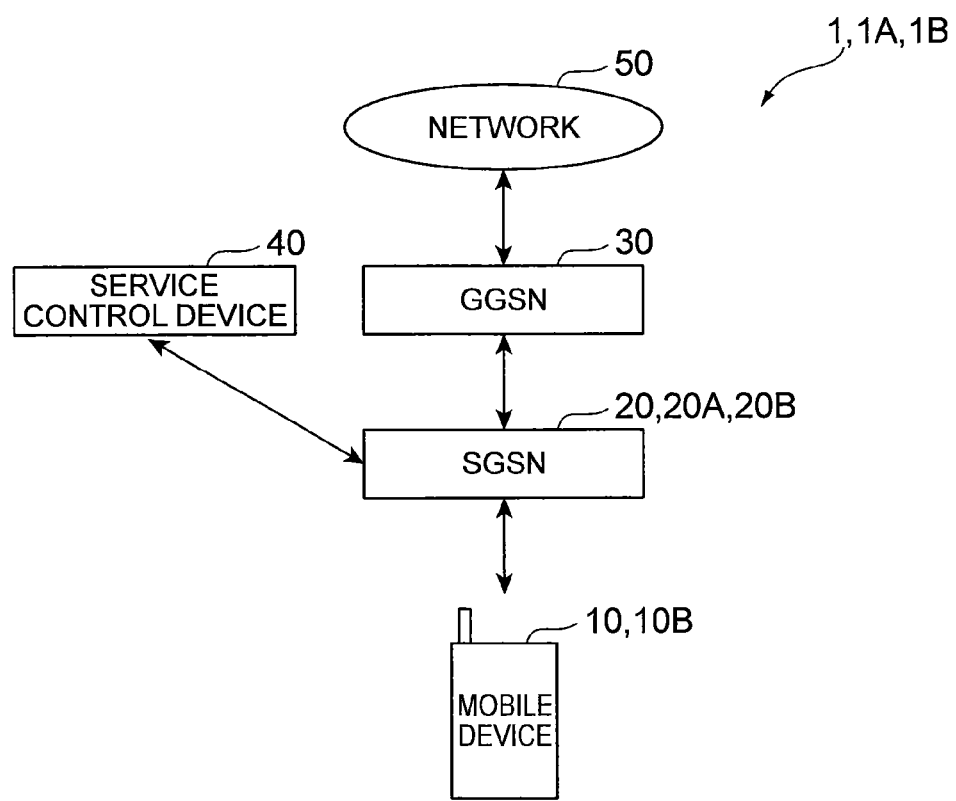
FIG. 1 is a schematic configuration diagram of a communication system according to first to third embodiments.

Hereinafter, favorable embodiments of a communication system, a communication control device, a communication method, and a communication system to which a mobile device is applied according to the present invention will be described with reference to the drawings. Moreover, in the description of the drawings, same elements will be denoted by same reference characters and overlapping descriptions will be omitted.

First Embodiment

FIG. 1 is a schematic configuration diagram of a communication system according to a first embodiment. As shown in FIG. 1, a communication system 1 is a communication system using a GPRS and is configured to include a prepaid mobile device 10, an SGSN (communication control device) 20, a GGSN 30, a service control device 40, and a network 50.

The mobile device 10 is a mobile communication terminal and communicates with the network 50 that is a destination of communication via the SGSN 20 and the GGSN 30. In addition, the mobile device 10 is a prepaid communication terminal and performs packet communication within the limit of a fee paid in advance. Furthermore, upon initiating communication, the mobile device 10 transmits identification information of a subscriber using the mobile device 10 (more specifically, identification information of an SIM card) and APN information (access point information) capable of identifying an APN (access point) that is accessed when connecting to a communication network to the SGSN 20. Details of processes performed by the mobile device 10 will be described later.

The SGSN 20 performs wireless communication with the mobile device 10 existing within a predetermined area managed by the SGSN 20 itself and connects the mobile device 10 and the GGSN 30 with each other. Normally, the SGSN 20 exists in plurality within a communication area. In addition, the SGSN 20 controls communication by the mobile device 10 based on fee management data acquired from the service control device 40. Communication control performed by the SGSN 20 based on fee management data will be described in detail later.

The GGSN 30 is a node that functions as a gateway to other data communication networks such as the Internet. Normally, the GGSN 30 exists in plurality within a communication network.

The service control device 40 stores fee management data for providing a prepaid communication connection service to the mobile device 10. Specifically, the fee management data associates, with each other, identification information of a subscriber using the mobile device 10, APN information capable of identifying an APN that is accessed when connecting the mobile device 10 to a communication network, and a remaining communication volume which can be used for a communication connection through the APN. FIG. 2 is a diagram showing a specific example of fee management data. As shown in FIG. 2, in the fee management data, a plurality of pieces of APN information and remaining communication volumes are associated with a single unit of subscriber identification information. For example, APN information "APN_#1, APN_#2, and APN_#3" and remaining communication volumes "10, 0, and 20" are respectively associated to a subscriber with identification information "A001".

In addition, the service control device 40 updates fee management data based on a remaining communication volume received from the SGSN 20 and updates fee management data when a payment of a fee is made by the user of the mobile device 10 or the like. Moreover, an HLR (Home Location Register) can be used as the service control device 40.

Figure 3:
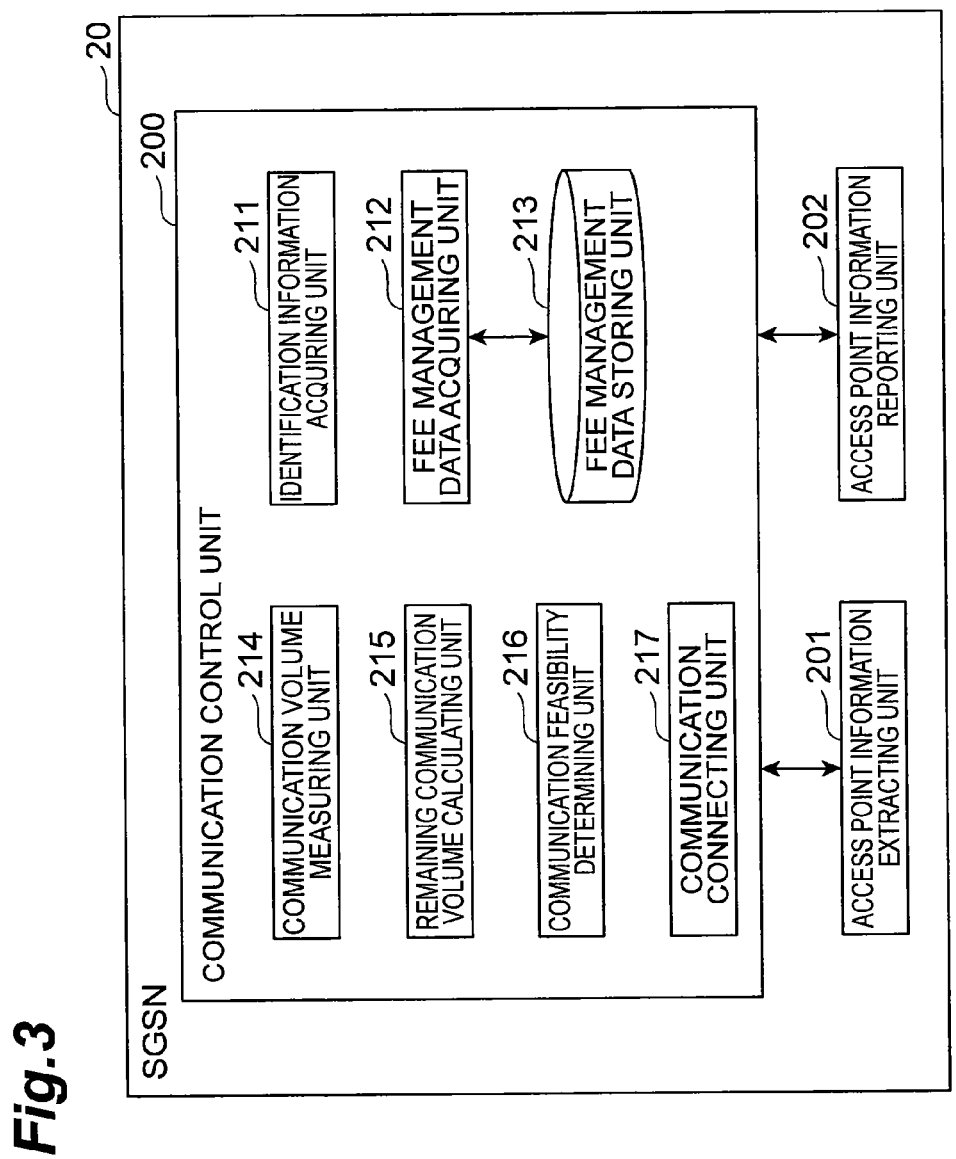
FIG. 3 is a diagram showing a detailed configuration of an SGSN according to the first embodiment.

Next, the SGSN 20 will be described in detail. FIG. 3 is a detailed configuration diagram of the SGSN shown in FIG. 1. As shown in FIG. 3, the SGSN 20 is configured to include a communication control unit 200, an access point information extracting unit (access point information extracting means) 201, and an access point information reporting unit (access point information reporting means) 202. In addition, the communication control unit 200 is configured to include an identification information acquiring unit (identification information acquiring means) 211, a fee management data acquiring unit (remaining communication volume acquiring means) 212, a fee management data storing unit (remaining communication volume storage device) 213, a communication volume measuring unit (communication volume measuring means) 214, a remaining communication volume calculating unit (remaining communication volume calculating means) 215, a communication feasibility determining unit (communication feasibility determining means) 216, and a communication connecting unit 217.

From a connection request signal of the mobile device 10 having made an initiation request for a communication connection, the identification information acquiring unit 211 acquires identification information of a subscriber of the mobile device 10 and APN information regarding an APN used upon communication connection.

When the mobile device 10 performs position registration, the fee management data acquiring unit 212 acquires APN information associated with the identification information of a subscriber of the mobile device 10 and a remaining communication volume associated with the APN information from fee management data stored by the service control device 40. In addition, during a so-called handover, the fee management data acquiring unit 212 acquires APN information associated with the identification information of a subscriber of the mobile device 10 and a remaining communication volume associated with the APN information from an SGSN that manages communication of a predetermined area that is a home of the mobile device 10. As for the acquired information, the fee management data storing unit 213 stores the identification information of the subscriber of the mobile device 10, the APN information, and the remaining communication volume in association with each other.

Furthermore, when the mobile device 10 makes an initiation request for a communication connection, based on the identification information and the APN information acquired by the identification information acquiring unit 211, the fee management data acquiring unit 212 acquires a remaining communication volume of the mobile device 10 which corresponds to the identification information and the APN information from the fee management data storing unit 213.

The communication volume measuring unit 214 measures a communication volume from the start of communication by the mobile device 10.

The remaining communication volume calculating unit 215 calculates a remaining communication volume which can be used for communication by the mobile device 10 based on a remaining communication volume acquired by the fee management data acquiring unit 212 when the mobile device 10 had made the initiation request for communication connection and a communication volume measured by the communication volume measuring unit 214. The remaining communication volume can be expressed as a remaining communication time during which communication can be performed or as a remaining data volume which can be communicated.

The communication feasibility determining unit 216 determines whether or not communication by the mobile device 10 can be continued based on the remaining communication volume calculated by the remaining communication volume calculating unit 215. Specifically, it is determined that communication by the mobile device 10 cannot be continued when the remaining communication volume calculated by the remaining communication volume calculating unit 215 becomes zero (or when the remaining communication volume calculated by the remaining communication volume calculating unit 215 equals or falls below a predetermined value).

The communication connecting unit 217 performs a communication connection of the mobile device 10, and continues the communication connection when the communication feasibility determining unit 216 determines that communication can be continued. On the other hand, the communication connecting unit 217 disconnects communication when the communication feasibility determining unit 216 determines that communication cannot be continued.

When the communication feasibility determining unit 216 determines that communication cannot be continued, the access point information extracting unit 201 extracts APN information regarding an APN which is associated with the mobile device 10 and which has an unused remaining communication volume from the fee management data storing unit 213. Moreover, when there is APN information regarding a plurality of APNs with unused remaining communication volumes, the access point information extracting unit 201 can extract all of a plurality of pieces APN information.

The access point information reporting unit 202 reports the APN information extracted by the access point information extracting unit 201 to the mobile device 10. At the same time, the access point information reporting unit 202 reports a disconnect signal of communication to the mobile device 10. Examples of methods of reporting the APN information and the disconnect signal include reporting by including APN information in a disconnect signal (Deactivation signal). Alternatively, data which associates a USSD (Unstructured Supplementary Service Data) code for making an inquiry regarding contract information of the user of the mobile device 10 and APN information with each other may be shared in advance between the mobile device 10 and an SGSN 20A, and a connection result reporting unit 204A may transmit a USSD code corresponding to APN information regarding a changed APN to the mobile device 10. In this case, the access point information reporting unit 202 reports a disconnect signal and the USSD code to the mobile device 10. Furthermore, besides a USSD code, a text message (SMS) can be transmitted. In addition, the access point information reporting unit 202 is capable of adding a priority order to APN information when reporting the APN information to the mobile device 10. The priority order may be retained in advance as a list in which an order is associated with each piece of APN information, or may be acquired from another storage device or the like. Furthermore, when reporting the APN information to the mobile device 10, the access point information reporting unit 202 is also capable of reporting a remaining communication volume associated with the APN information to the mobile device 10.

Figure 4:
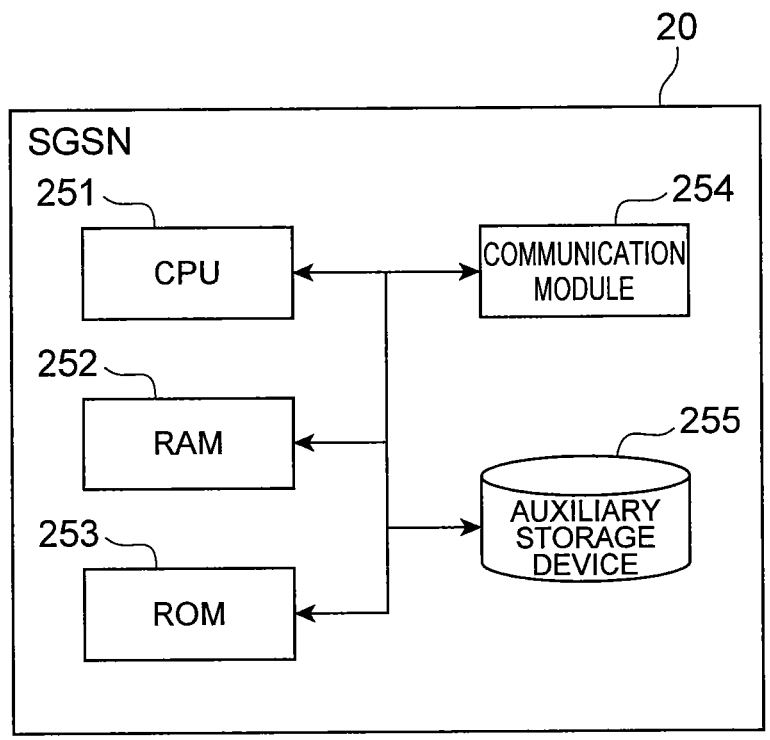
FIG. 4 is a diagram showing a hardware configuration of an SGSN according to the first embodiment.

A hardware configuration of the SGSN 20 will now be described. FIG. 4 is a diagram showing a hardware configuration of an SGSN. As shown in FIG. 4, the SGSN 20 is configured as a computer comprising hardware such as a CPU (Central Processing Unit) 251, a RAM (Random Access Memory) 252 and a ROM (Read Only Memory) 253 which are main storage devices, a communication module 254 for performing communication, and an auxiliary storage device 255 that is a hard disk or the like. The respective functions of the SGSN 20 described above are realized by operations of these components.

Figure 5:
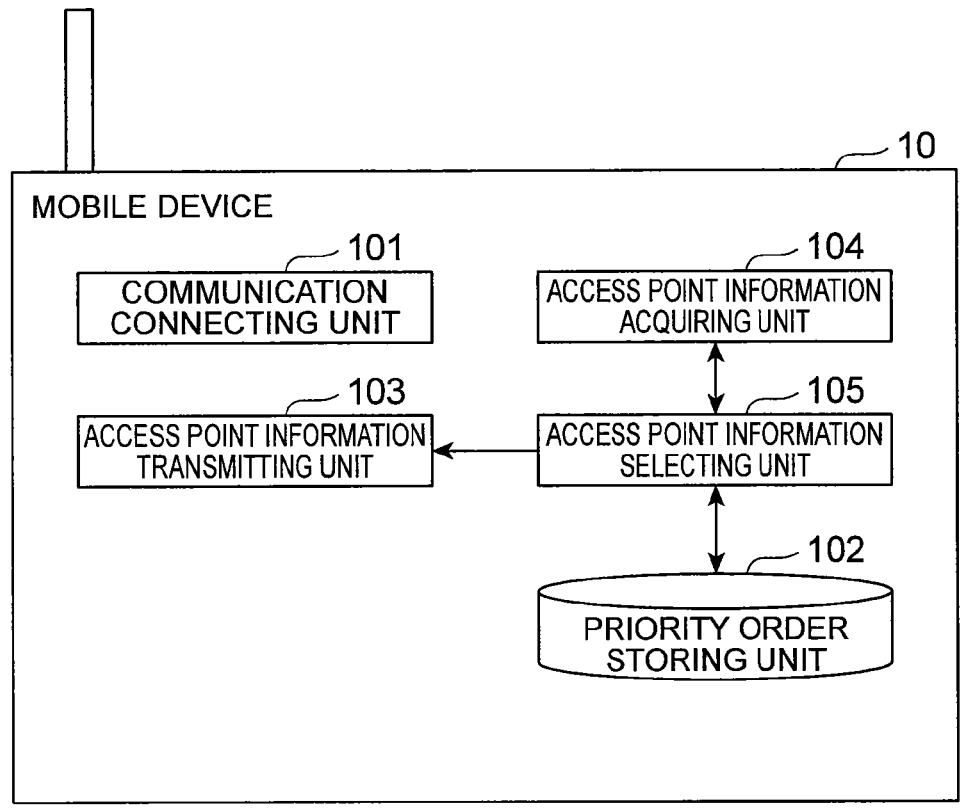
FIG. 5 is a diagram showing a detailed configuration of a mobile device according to the first embodiment.

Next, the mobile device 10 will be described in detail. FIG. 5 is a detailed configuration diagram of the mobile device shown in FIG. 1. As shown in FIG. 5, the mobile device 10 is configured to include a communication connecting unit 101, a priority order storing unit (priority order storing means) 102, an access point information transmitting unit (access point information transmitting means) 103, an access point information acquiring unit (access point information acquiring means) 104, and an access point information selecting unit (access point information selecting means) 105.

The communication connecting unit 101 controls packet communication performed between the network 50 and the mobile device 10.

The priority order storing means 102 stores a plurality of pieces of APN information and a priority order when connecting to APNs indicated by the respective pieces of APN information in association with each other. For example, the priority order is set in advance by a subscriber of the mobile device 10 or set according to predetermined conditions.

Upon initiating communication, the access point information transmitting unit 103 transmits APN information regarding an APN to which the mobile device 10 connects when performing communication and identification information of a subscriber of the mobile device 10 to the SGSN 20. For example, the APN information transmitted at this point is APN information set in advance by the subscriber of the mobile device 10 and retained by the access point information transmitting unit 103. In addition, when APN information is selected by the access point information selecting unit 105 (to be described in detail later), the access point information transmitting unit 103 retains the selected APN information and transmits the APN information selected by the access point information selecting unit 105 together with identification information to the SGSN 20 when next performing communication.

The access point information acquiring unit 104 acquires APN information reported from the access point information reporting unit 202 of the SGSN 20. When a plurality of pieces of APN information is reported from the access point information reporting unit 202, the access point information acquiring unit 104 acquires the plurality of pieces of reported APN information.

The access point information selecting unit 105 selects APN information satisfying predetermined conditions from the APN information acquired by the access point information acquiring unit 104. Specifically, based on the priority order stored in the priority order storing unit 102, the access point information selecting unit 105 selects APN information with a highest priority order among the plurality of pieces of APN information acquired by the access point information acquiring unit 104. In addition, when a priority order has been added to APN information by the access point information reporting unit 202 of the SGSN 20, the access point information selecting unit 105 can select APN information by also taking this priority order into consideration. Furthermore, when a remaining communication volume has been added to APN information, the access point information selecting unit 105 can select APN information by also taking the remaining communication volume into consideration or display the remaining communication volume on a display screen or the like. Moreover, instead of having the access point information selecting unit 105 select APN information, the access point information selecting unit 105 may cause an application program that had initiated communication by the mobile device 10 or the user of the mobile device 10 to select the APN information. For example, the application program can select APN information depending on a destination of communication by the mobile device 10 or select APN information based on the remaining communication volume added to the APN information. By enabling an application program or a user of a mobile device to select APN information, the convenience upon selecting APN information can be improved.

Next, a hardware configuration of the mobile device 10 will now be described. In a similar manner to the hardware configuration of the SGSN 20 shown in FIG. 4, the mobile device 10 is configured as a computer comprising hardware such as a CPU, a RAM and a ROM which are main storage devices, a communication module for performing communication, and an auxiliary storage device that is a hard disk or the like. The respective functions of the mobile device 10 described above are realized by operations of these components.

Figure 6:
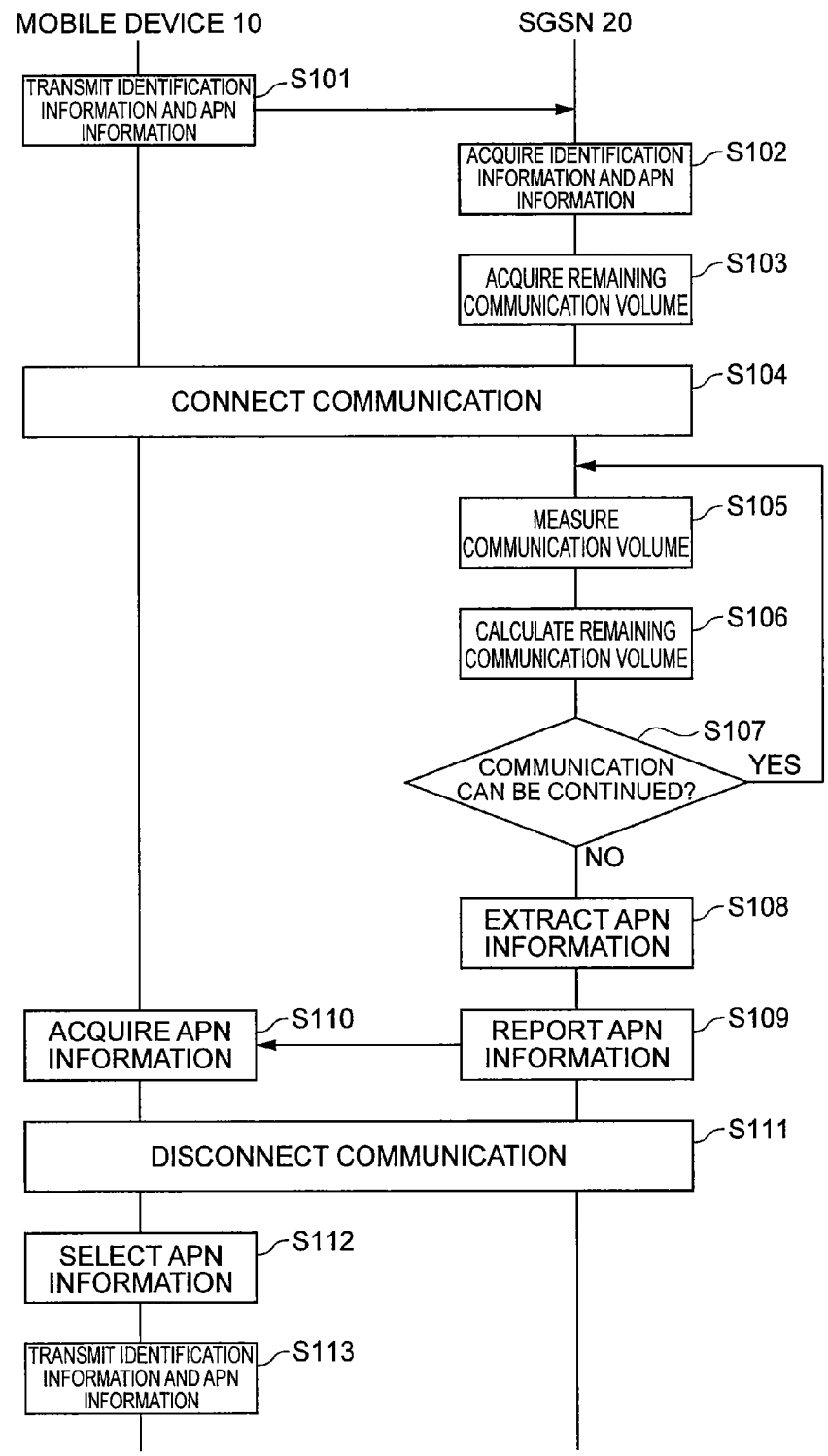
FIG. 6 is a sequence diagram showing a flow of processes performed by a mobile device and an SGSN according to the first embodiment.

Next, a flow of processes performed by the mobile device 10 and the SGSN 20 when a remaining communication volume is exhausted during communication will be described. FIG. 6 is a sequence diagram showing a flow of processes performed by a mobile device and an SGSN. Upon initiating a communication connection, the mobile device 10 transmits a signal of an initiation request for a communication connection to the SGSN 20. At this point, the access point information transmitting unit 103 of the mobile device 10 transmits identification information and APN information to the SGSN 20 by including the identification information and the APN information in the signal of an initiation request for a communication connection (step S101).

The identification information acquiring unit 211 of the SGSN 20 acquires identification information and APN information from the signal of the initiation request of the mobile device 10 which had made the initiation request for a communication connection (step S102). Subsequently, based on the identification information and the APN information acquired by the identification information acquiring unit 211, the fee management data acquiring unit 212 of the SGSN 20 acquires a remaining communication volume from the fee management data storing unit 213 (step S103).

The communication connecting unit 217 of the SGSN 20 connects the mobile device 10 to the network 50 (step S104). It is assumed that a remaining communication volume is unused at this point. Alternatively, when the remaining communication volume has been exhausted, the communication connecting unit 217 restricts communication by the mobile device 10.

After the mobile device 10 enters a communication connection state, the communication volume measuring unit 214 of the SGSN 20 measures a communication volume from the start of communication by the mobile device 10 (step S105). In addition, the remaining communication volume calculating unit 215 of the SGSN 20 calculates a remaining communication volume which can be used for communication by the mobile device 10 (step S106).

The communication feasibility determining unit 216 of the SGSN 20 determines whether or not communication by the mobile device 10 can be continued based on the remaining communication volume calculated by the remaining communication volume calculating unit 215 (step S107). When communication can be continued (YES in step S107), measurement of a communication volume by the communication volume measuring unit 214 and calculation of a remaining communication volume by the remaining communication volume calculating unit 215 are performed until the communication can no longer be continued.

When communication cannot be continued (NO in step S107), the access point information extracting unit 201 of the SGSN 20 extracts APN information which is associated with the mobile device 10 and which has an unused remaining communication volume from the fee management data storing unit 213 (step S108).

The access point information reporting unit 202 of the SGSN 20 reports the APN information extracted by the access point information extracting unit 201 and a disconnect signal to the mobile device 10 (step S109). The access point information acquiring unit 104 of the mobile device 10 acquires the APN information and the disconnect signal reported from the access point information reporting unit 202 of the SGSN 20 (step S110). Accordingly, the communication between the mobile device 10 and the SGSN 20 is disconnected (step S111).

In addition, the access point information selecting unit 105 of the mobile device 10 selects APN information having a high priority order from the APN information acquired by the access point information acquiring unit 104 (step S112). The access point information transmitting unit 103 of the mobile device 10 retains APN information selected by the access point information selecting unit 105, and transmits the APN information selected by the access point information selecting unit 105 to the SGSN 20 when next performing communication (step S113). Subsequent processes are the same as processes of step S102 and thereafter described earlier.

The present embodiment is configured as described above, and during communication by the mobile device 10, when the communication feasibility determining unit 216 of the SGSN 20 determines based on a remaining communication volume that the communication by the mobile device 10 cannot be continued, the access point information extracting unit 201 extracts APN information regarding an APN with an unused remaining communication volume and reports the extracted APN information to the mobile device. The access point information acquiring unit 104 of the mobile device 10 acquires APN information regarding the APN with an unused remaining communication volume. When communication is next initiated, the APN information regarding the APN with an unused remaining communication volume is transmitted to the SGSN 20 to perform communication. In this manner, since APN information regarding an APN with an unused remaining communication volume is comprehended by the mobile device 10 and the mobile device 10 can perform communication based on the APN information regarding the APN with an unused remaining communication volume, a communication connection with greater convenience can be performed.

In addition, since communication can be performed by the mobile device 10 based on APN information that satisfies predetermined conditions among a plurality of pieces of APN information, a communication connection based on more favorable APN information can be performed.

Furthermore, the access point information selecting unit 105 of the mobile device 10 can readily select APN information from a plurality of pieces of APN information based on a priority order associated in advance with each piece of APN information.

Moreover, in the present embodiment, for example, when the mobile device 10 does not possess information regarding a priority order associated with APN information, the SGSN 20 may set a priority order to APN information when the remaining communication volume is exhausted and report information regarding the priority order to the mobile device 10 together with the APN information. Alternatively, the SGSN 20 may select APN information regarding an APN that can be used by the mobile device 10 and report the selected APN information to the mobile device 10.

Second Embodiment

A schematic configuration diagram of a communication system according to a second embodiment is similar to the communication system according to the first embodiment shown in FIG. 1. As shown in FIG. 1, a communication system 1A according to the present embodiment is a communication system using a GPRS and is configured to include a prepaid mobile device 10, an SGSN (communication control device) 20A, a GGSN 30, a service control device 40, and a network 50.

The mobile device 10 is a mobile communication terminal and communicates with the network 50 that is a destination of communication via the SGSN 20A and the GGSN 30. In addition, the mobile device 10 is a prepaid communication terminal and performs packet communication within the limit of a fee paid in advance. Furthermore, upon initiating communication, the mobile device 10 transmits identification information of a subscriber using the mobile device 10 and APN information (access point information) capable of identifying an APN (access point) that is accessed when connecting to a communication network to the SGSN 20A.

The SGSN 20A performs wireless communication with the mobile device 10 existing within a predetermined area managed by the SGSN 20A itself and connects the mobile device 10 and the GGSN 30 with each other. Normally, the SGSN 20A exists in plurality within a communication area. In addition, the SGSN 20A controls communication by the mobile device 10 based on fee management data acquired from the service control device 40. An initiation process of a communication connection by the SGSN 20A based on fee management data will be described in detail later.

The GGSN 30 and the service control device 40 are configured the same as the GGSN 30 and the service control device 40 according to the first embodiment.

Figure 7:
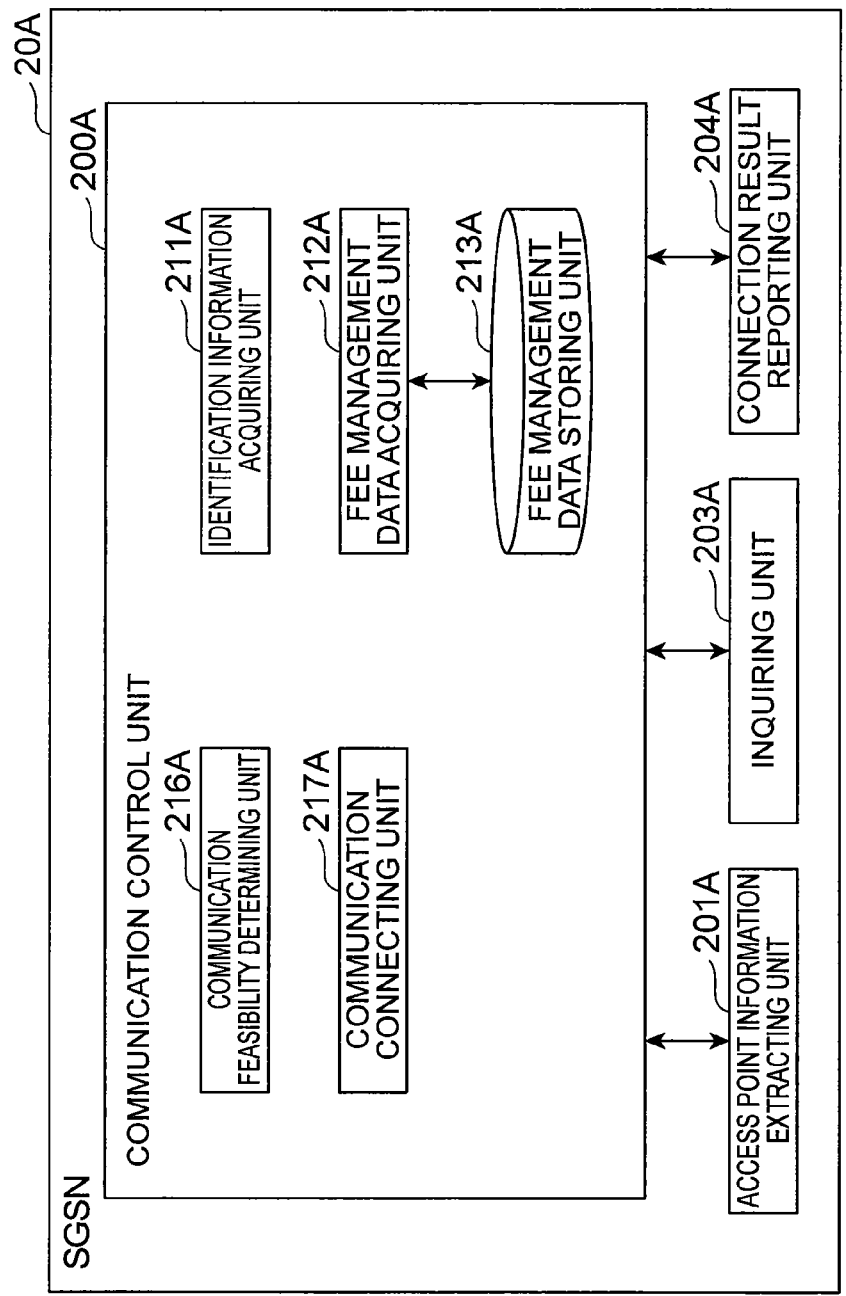
FIG. 7 is a diagram showing a detailed configuration of an SGSN according to the second embodiment.

Next, the SGSN 20A will be described in detail. FIG. 7 is a detailed configuration diagram of an SGSN according to the second embodiment. The SGSN 20A is configured to include a communication control unit 200A, an access point information extracting unit (access point information extracting means) 201A, an inquiring unit (inquiring means) 203A, and a connection result reporting unit (connection result reporting means) 204A. In addition, the communication control unit 200A is configured to include an identification information acquiring unit (identification information acquiring means) 211A, a fee management data acquiring unit (remaining communication volume acquiring means) 212A, a fee management data storing unit (remaining communication volume storage device) 213A, a communication feasibility determining unit (communication feasibility determining means) 216A, and a communication connecting unit (communication connecting means) 217A.

From a connection request signal of the mobile device 10 having made an initiation request for a communication connection, the identification information acquiring unit 211A acquires identification information of a subscriber of the mobile device 10 and APN information regarding an APN used upon communication connection.

When the mobile device 10 performs position registration, the fee management data acquiring unit 212A acquires APN information associated with the identification information of a subscriber of the mobile device 10 and a remaining communication volume associated with the APN information from fee management data stored by the service control device 40. In addition, during a so-called handover, the fee management data acquiring unit 212A acquires APN information associated with the identification information of a subscriber of the mobile device 10 and a remaining communication volume associated with the APN information from an SGSN that manages communication of a predetermined area that is a home of the mobile device 10. As for the acquired information, the fee management data storing unit 213A stores the identification information of the subscriber of the mobile device 10, the APN information, and the remaining communication volume in association with each other.

Furthermore, when the mobile device 10 makes an initiation request for a communication connection, based on the identification information and the APN information acquired by the identification information acquiring unit 211A, the fee management data acquiring unit 212A acquires a remaining communication volume of the mobile device 10 which corresponds to the identification information and the APN information from the fee management data storing unit 213A.

The communication feasibility determining unit 216A determines whether or not a communication connection by the mobile device 10 can be performed based on a remaining communication volume acquired by the fee management data acquiring unit 212A when an initiation request for a communication connection had been made by the mobile device 10. Specifically, the communication feasibility determining unit 216A determines that the communication connection cannot be performed when the remaining communication volume becomes zero (or when the remaining communication volume equals or falls below a predetermined value).

When the communication feasibility determining unit 216A determines that the communication connection can be performed, the communication connecting unit 217A performs a communication connection of the mobile device 10 based on the APN information extracted by the fee management data acquiring unit 212A upon initiating communication connection. In addition, when a result of an inquiry made by the inquiring unit 203A (to be described in detail later) substantially authorizes a connection to the inquired APN, the communication connecting unit 217A performs a process to connect to the inquired APN.

When the communication feasibility determining unit 216A determines upon initiating a communication connection that the communication connection cannot be made, the access point information extracting unit 201A extracts APN information regarding an APN which is associated with the mobile device 10 and which has an unused remaining communication volume from the fee management data storing unit 213A. Moreover, when there is information regarding a plurality of APNs with an unused remaining communication volume, for example, the access point information extracting unit 201A can extract APN information with a highest priority based on data regarding priority which is set for each APN and which is retained by the access point information extracting unit 201A in advance.

The inquiring unit 203A makes an inquiry to the user of the mobile device 10 regarding whether or not a connection may be made to the APN indicated by the APN information extracted by the access point information extracting means 201A.

The connection result reporting unit 204A reports the APN information regarding the APN to which the mobile device 10 has been connected by the communication connecting unit 217A to the mobile device 10. The reporting can be performed by having the mobile device 10 and the SGSN 20A share in advance data which associates USSD codes with APN information, and having the connection result reporting unit 204A transmit a USSD code corresponding to APN information regarding a changed APN to the mobile device 10. Alternatively, the reporting can be made by transmitting a text message (SMS).

In a similar manner to the SGSN 20 according to the first embodiment, the SGSN 20A is configured as a computer comprising hardware such as a CPU, a RAM and a ROM which are main storage devices, a communication module for performing communication, and an auxiliary storage device that is a hard disk or the like. The respective functions of the SGSN 20A described above are realized by operations of these components.

Figure 8:
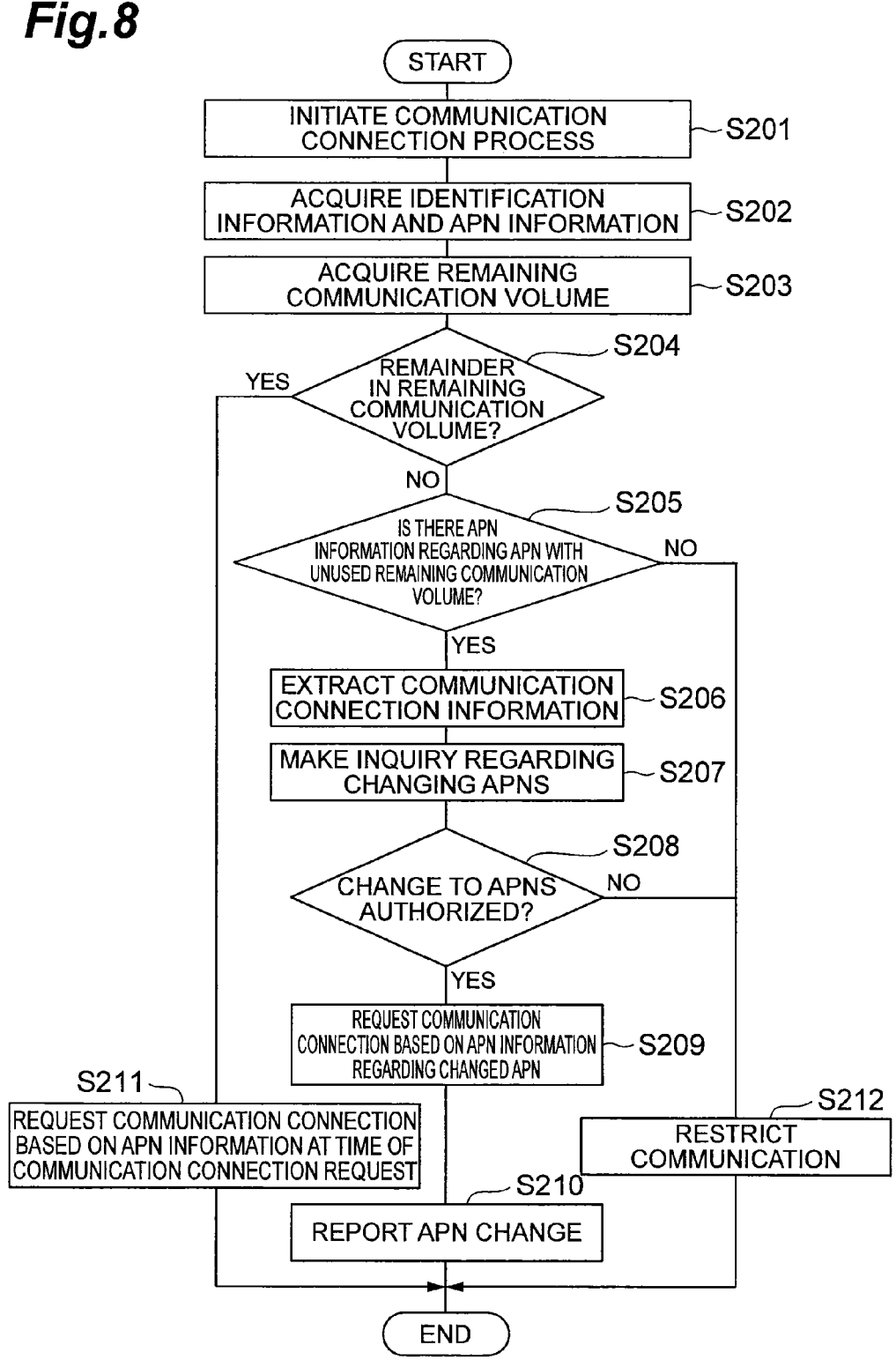
FIG. 8 is a flow chart showing a flow of processes performed by an SGSN according to the second embodiment.

Next, a flow of an initiation process performed by the SGSN 20A for a communication connection based on a remaining communication volume of the mobile device 10 will be described. FIG. 8 is a flow chart showing a flow of an initiation process for a communication connection performed by an SGSN. When a request for a communication connection is made by the mobile device 10, the communication control unit 200A initiates a communication connection process (step S201).

In addition, the identification information acquiring unit 211A acquires identification information of the subscriber of the mobile device 10 and APN information from a connection request signal transmitted by the mobile device 10 (step S202).

The fee management data acquiring unit 212A acquires a remaining communication volume associated with the identification information and the APN information acquired by the identification information acquiring unit 211A from the fee management data storing unit 213A (step S203). The communication feasibility determining unit 216A determines whether or not the remaining communication volume acquired by the fee management data acquiring unit 212A is unused (step S204). When the remaining communication volume has been exhausted (NO in step S204), the access point information extracting unit 201A determines whether or not APN information regarding another APN with an unused remaining communication volume is stored in the fee management data storing unit 213A (step S205).

When APN information regarding another APN with an unused remaining communication volume is stored in the fee management data storing unit 213A (YES in step S205), the access point information extracting unit 201A extracts the APN information from the fee management data storing unit 213A (step S206).

The inquiring unit 203A makes an inquiry to the user of the mobile device 10 regarding whether or not the APN to which the mobile device 10 is connected when connecting to the communication network can be changed to an APN indicated by the APN information extracted by the access point information extracting unit 201A (step S207). Subsequently, the inquiring unit 203A determines whether or not a response from the user of the mobile device 10 to the inquiry indicates an authorization to change the APNs (step S208).

When the response to the inquiry indicates an authorization to change the APNs (YES in step S208), the communication connecting unit 217A transmits the APN information indicating the authorized APN to the GGSN 30 by including the APN information in a communication connection request signal (step S209). The connection result reporting unit 204A reports to the mobile device 10 that the APN to which the mobile device 10 is to be connected has been changed (step S210). Accordingly, a communication session is established between the mobile device 10 and the network 50 and the initiation process for a communication connection by the SGSN 20A is completed.

In addition, when the remaining communication volume acquired based on the identification information and the APN information acquired from the communication connection request signal is unused (YES in step S204), the communication connecting unit 217A transmits the APN information acquired from the connection request signal to the GGSN 30 by including the APN information in the communication connection request signal (step S211). Accordingly, a communication session is established between the mobile device 10 and the network 50 and the initiation process for a communication connection by the SGSN 20A is completed.

On the other hand, when APN information regarding an APN with an unused remaining communication volume is not stored in the fee management data storing unit 213A (NO in step S205) and the response to the inquiry regarding whether or not APNs may be changed is not an authorization to change APNs (NO in step S208), the SGSN 20A restricts communication by the mobile device 10 (step S212).

The present embodiment is configured as described above and, upon the mobile device 10 initiating communication, the communication feasibility determining unit 216A of the SGSN 20A determines based on a remaining communication volume that the communication by the mobile device 10 cannot be continued, the access point information extracting unit 201A extracts APN information regarding an APN with an unused remaining communication volume and a communication connection of the mobile device 10 is performed based on the extracted APN information. Accordingly, since a communication connection of the mobile device 10 is performed based on APN information regarding an APN with an unused remaining communication volume when a remaining communication volume has been exhausted, an operation for switching to a communication connection based on APN information regarding an APN with an unused remaining communication volume need not be performed by the user of the mobile device 10 and a communication connection with greater convenience can be performed.

In addition, by performing a communication connection based a result of an inquiry made by the inquiring unit 203A, a communication connection that reflects the user's intentions can be performed.

Furthermore, since APN information regarding the APN to which the mobile device 10 has been connected is reported to the mobile device, the user of the mobile device 10 can be informed of the APN to which the mobile device 10 is connected.

Moreover, while it is determined in the second embodiment that a remaining communication volume has been exhausted when the remaining communication volume acquired upon initiating a communication connection is zero, a determination that a remaining communication volume has been exhausted can also be made when the remaining communication volume falls to or below a predetermined level. In this case, APN information regarding an APN with an unused remaining communication volume is extracted by the access point information extracting unit 201A, and when switching to the APN information is proposed to the user of the mobile device 10 but is then rejected, a communication connection is performed for a predetermined period of time until the remaining communication volume is exhausted based on APN information regarding the APN whose remaining communication volume is equal to or below a predetermined level.

Third Embodiment

A schematic configuration diagram of a communication system according to a third embodiment is similar to the communication system according to the first embodiment shown in FIG. 1. As shown in FIG. 1, a communication system 1B according to the present embodiment is a communication system using a GPRS and is configured to include a prepaid mobile device 10B, an SGSN (communication control device) 20B, a GGSN 30, a service control device 40, and a network 50.

The mobile device 10B is a mobile communication terminal and communicates with the network 50 that is a destination of communication via the SGSN 20B and the GGSN 30. In addition, the mobile device 10B is a prepaid communication terminal and performs packet communication within the limit of a fee paid in advance. Furthermore, upon initiating communication, the mobile device 10B transmits identification information of a subscriber using the mobile device 10B and APN information (access point information) capable of identifying an APN (access point) that is accessed when connecting to a communication network to the SGSN 20B. Details of processes performed by the mobile device 10B will be described later.

The SGSN 20B performs wireless communication with the mobile device 10B existing within a predetermined area managed by the SGSN 20B itself and connects the mobile device 10B and the GGSN 30 with each other. Normally, the SGSN 20B exists in plurality within a communication area. In addition, the SGSN 20B controls communication by the mobile device 10B based on fee management data acquired from the service control device 40. Communication control by the SGSN 20B based on fee management data will be described in detail later.

The GGSN 30 and the service control device 40 are configured the same as the GGSN 30 and the service control device 40 according to the first embodiment.

Figure 9:
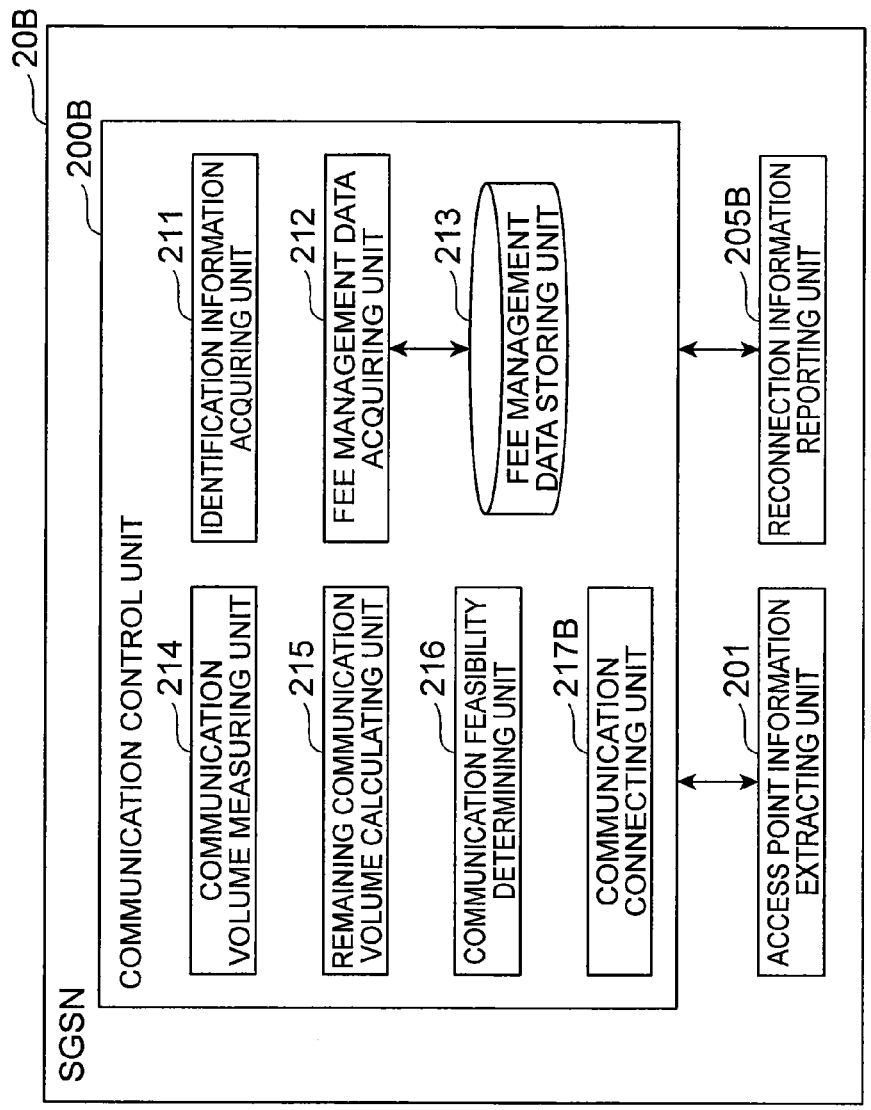
FIG. 9 is a diagram showing a detailed configuration of an SGSN according to the third embodiment.

Next, the SGSN 20B will be described in detail. FIG. 9 is a detailed configuration diagram of an SGSN according to the third embodiment. As shown in FIG. 9, the SGSN 20B is configured to include a communication control unit 200B, an access point information extracting unit (access point information extracting means) 201, and a reconnection information reporting unit (reconnection information reporting means) 205B. In addition, the communication control unit 200B is configured to include an identification information acquiring unit (identification information acquiring means) 211, a fee management data acquiring unit (remaining communication volume acquiring means) 212, a fee management data storing unit (remaining communication volume storage device) 213, a communication volume measuring unit (communication volume measuring means) 214, a remaining communication volume calculating unit (remaining communication volume calculating means) 215, a communication feasibility determining unit (communication feasibility determining means) 216, and a communication connecting unit (communication control device-side reconnecting means) 217B.

The identification information acquiring unit 211, the fee management data acquiring unit 212, the fee management data storing unit 213, the communication volume measuring unit 214, the remaining communication volume calculating unit 215, and the communication feasibility determining unit 216 are configured in a similar manner to the respective components in the communication control unit 200 according to the first embodiment.

The reconnection information reporting unit 205B reports APN information extracted by the access point information extracting unit 201 to the GGSN 30 and the mobile device 10B. Specifically, this reporting can be performed by transmitting PDP data including APN information. For example, PDP data includes QoS information, PDP Type information (IP or PPP), and the like in addition to APN information.

The communication connecting unit 217B performs a communication connection of the mobile device 10B, and continues the communication connection when the communication feasibility determining unit 216 determines that communication can be continued. On the other hand, the communication connecting unit 217B disconnects communication when the communication feasibility determining unit 216 determines that communication cannot be continued. In addition, the communication connecting unit 217B controls communication by the mobile device 10B based on APN information extracted by the access point information extracting unit 201.

Moreover, in a similar manner to the SGSN 20 according to the first embodiment, the SGSN 20B is configured as a computer comprising hardware such as a CPU, a RAM and a ROM which are main storage devices, a communication module for performing communication, and an auxiliary storage device that is a hard disk or the like. The respective functions of the SGSN 20B described above are realized by operations of these components.

Figure 10:
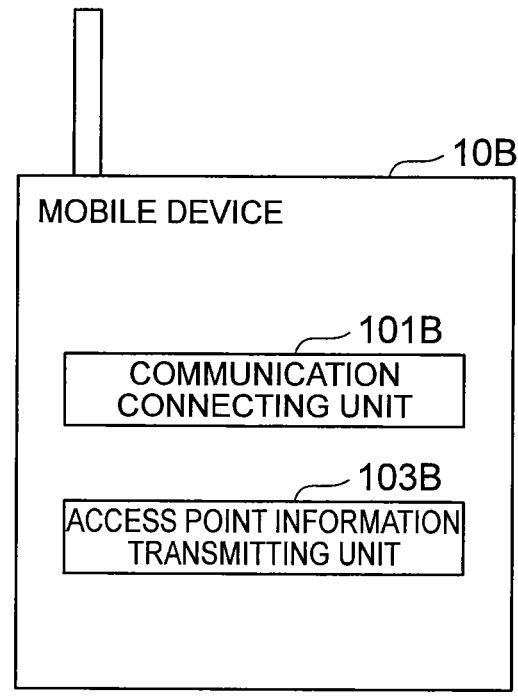
FIG. 10 is a diagram showing a detailed configuration of a mobile device according to the third embodiment.

Next, the mobile device 10B will be described in detail. FIG. 10 is a detailed configuration diagram of a mobile device according to the third embodiment. As shown in FIG. 10, the mobile device 10B is configured to include a communication connecting unit (mobile device-side reconnecting means) 101B and an access point information transmitting unit 103B.

The communication connecting unit 101B controls packet communication performed between the network 50 and the mobile device 10B. In addition, the communication connecting unit 101B performs a communication connection based on APN information reported from the reconnection information reporting unit 205B of the SGSN 20B.

Upon initiating communication, the access point information transmitting unit 103B transmits APN information regarding an APN to which the mobile device 10B connects when performing communication and identification information of a subscriber of the mobile device 10B to the SGSN 20B. For example, it is assumed that the APN information transmitted at this point is APN information set in advance by a subscriber of the mobile device 10B and retained by the access point information transmitting unit 103B.

Moreover, in a similar manner to the SGSN 20 according to the first embodiment, the mobile device 10B is configured as a computer comprising hardware such as a CPU, a RAM and a ROM which are main storage devices, a communication module for performing communication, and an auxiliary storage device that is a hard disk or the like. The respective functions of the mobile device 10B described above are realized by operations of these components.

Figure 11:
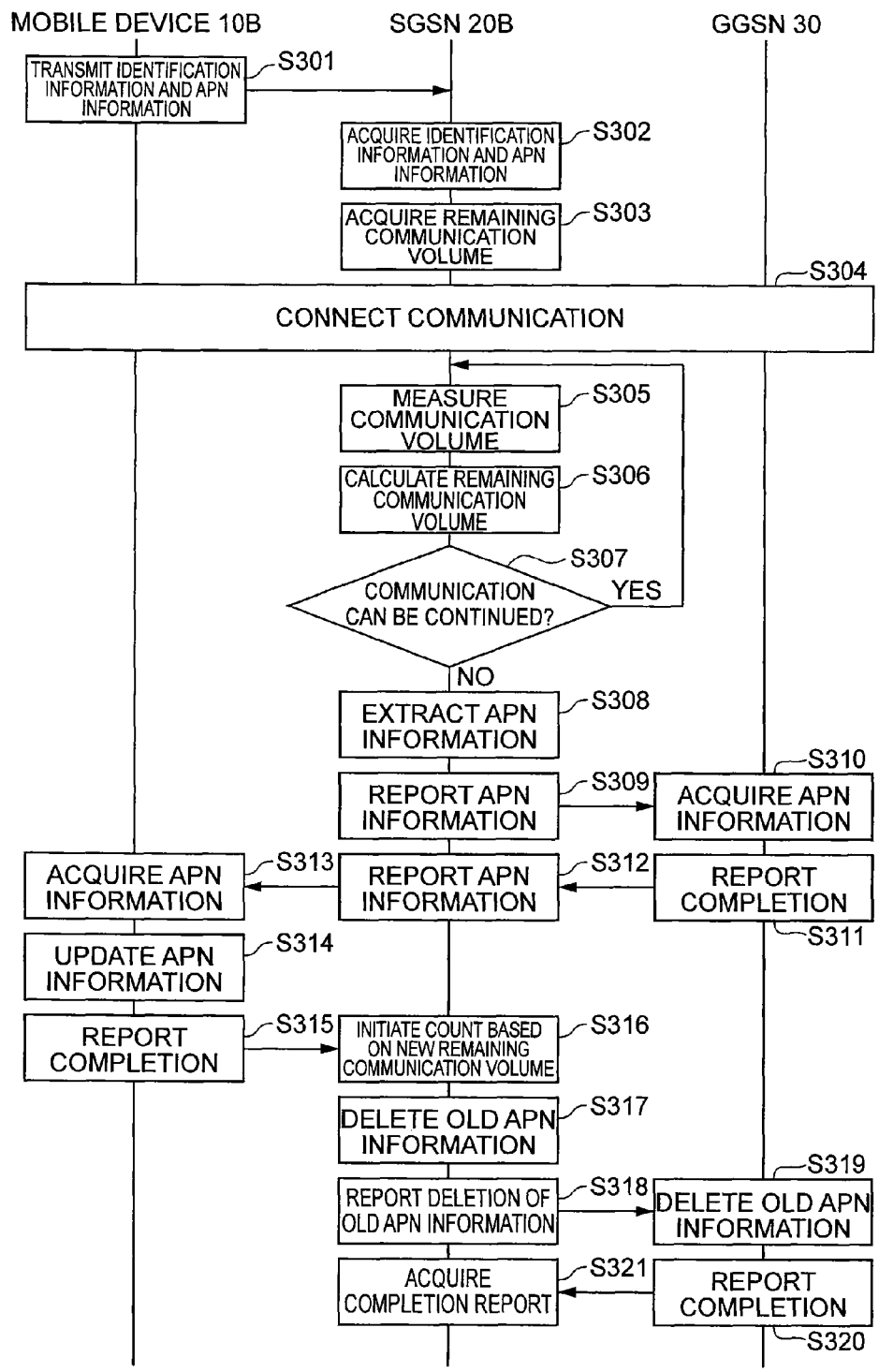
FIG. 11 is a sequence diagram showing a flow of processes performed by a mobile device, an SGSN, and a GGSN according to the third embodiment.

Next, a flow of processes performed by the mobile device 10B, the SGSN 20B, and the GGSN 30 when a remaining communication volume is exhausted during communication will be described. FIG. 11 is a sequence diagram showing a flow of processes performed by a mobile device, an SGSN, and a GGSN. Upon initiating a communication connection, the mobile device 10B transmits a signal of an initiation request for a communication connection to the SGSN 20B. At this point, the access point information transmitting unit 103B of the mobile device 10B transmits identification information and APN information to the SGSN 20B by including the identification information and the APN information in the signal of an initiation request for a communication connection (step S301).

The identification information acquiring unit 211 of the SGSN 20B acquires identification information and APN information from the signal of the initiation request of the mobile device 10B which had made the initiation request for communication connection (step S302). Subsequently, based on the identification information and the APN information acquired by the identification information acquiring unit 211, the fee management data acquiring unit 212 of the SGSN 20B acquires a remaining communication volume from the fee management data storing unit 213 (step S303).

The communication connecting unit 217B of the SGSN 20B connects the mobile device 10B to the network 50 via the GGSN 30 (step S304). It is assumed that a remaining communication volume is unused at this point. Alternatively, when a remaining communication volume has been exhausted, the communication connecting unit 217B restricts communication by the mobile device 10B.

After the mobile device 10B enters a communication connection state, the communication volume measuring unit 214 of the SGSN 20B measures a communication volume from the start of communication by the mobile device 10B (step S305). In addition, the remaining communication volume calculating unit 215 of the SGSN 20B calculates a remaining communication volume which can be used for connection by the mobile device 10B (step S306).

The communication feasibility determining unit 216 of the SGSN 20B determines whether or not communication by the mobile device 10B can be continued based on the remaining communication volume calculated by the remaining communication volume calculating unit 215 (step S307). When communication can be continued (YES in step S307), measurement of a communication volume by the communication volume measuring unit 214 and calculation of a remaining communication volume by the remaining communication volume calculating unit 215 are performed until the communication can no longer be continued.

When communication cannot be continued (NO in step S307), the access point information extracting unit 201 of the SGSN 20B extracts APN information which is associated with the mobile device 10B and which has an unused remaining communication volume from the fee management data storing unit 213 (step S308).

The reconnection information reporting unit 205B of the SGSN 20B reports the APN information extracted by the access point information extracting unit 201 to the GGSN 30 (step S309). Upon acquiring the APN information from the SGSN 20B (step S310), the GGSN 30 reports to the SGSN 20B that acquisition of APN information has been completed (step S311).

Upon acquiring a report of completion from the GGSN 30, the reconnection information reporting unit 205B of the SGSN 20B also reports the APN information extracted by the access point information extracting unit 201 to the mobile device 10B (step S312). Upon acquiring the APN information reported from the SGSN 20B (step S313), the communication connecting unit 101B of the mobile device 10B updates APN information to be used upon communication connection to the APN information received from the SGSN 20B (step S314), and performs a communication connection based on the updated APN information.

In addition, the communication connecting unit 101B of the mobile device 10B reports to the SGSN 20B that an update of APN information has been completed (step S315). When the reconnection information reporting unit 205B of the SGSN 20B acquires the report of completion reported from the mobile device 10B, the remaining communication volume calculating unit 215 calculates a remaining communication volume which can be used for communication by the mobile device 10B based on a remaining communication volume associated with the APN information extracted by the access point information extracting unit 201 and a communication volume measured by the communication volume measuring unit 214 (step S316).

Subsequently, the reconnection information reporting unit 205B deletes APN information associated with the remaining communication volume regarding which a judgment had been made by the communication feasibility determining unit 216 that communication cannot be continued (NO in step S307) or, in other words, old APN information from the fee management data storing unit 213 (step S317). In addition, the reconnection information reporting unit 205B reports to the GGSN 30 that old APN information is to be deleted (step S318).

Upon receiving a report that old APN information is to be deleted from the SGSN 20B, the GGSN 30 deletes the specified old APN information (step S319) and reports the SGSN 20B that deletion has been completed (step S320). The report of completion of deletion transmitted from the GGSN 30 is received by the reconnection information reporting unit 205B of the SGSN 20B (step S321). Accordingly, a communication connection process is performed based on APN information regarding an APS with an unused remaining communication volume which had been extracted when a remaining communication volume had been exhausted and a communication connection state is realized.

The present embodiment is configured as described above and, during communication by the mobile device 10B, when the communication feasibility determining unit 216 of the SGSN 20B determines based on a remaining communication volume that the communication by the mobile device 10B cannot be continued, the access point information extracting unit 201 of the SGSN 20B extracts APN information regarding an APN with an unused remaining communication volume and communication by the mobile device 10B is controlled by the communication connecting unit 217B based on the extracted APN information. In this manner, since communication can be controlled based on APN information regarding an APN with an unused remaining communication volume without interrupting a session when a remaining communication volume is exhausted, a communication connection with greater convenience can be performed.

In addition, the mobile device 10B can perform a communication connection based on APN information reported from the SGSN 20B.

Although the mobile device 10B instantaneously enters a state where the communication connection is disconnected when a remaining communication volume is exhausted, a communication connection is performed shortly afterwards according to APN information regarding an APN with an unused remaining communication volume.

Moreover, the present invention is not limited to the respective embodiments described above. For example, while the access point information extracting units 201 and 201A are arranged so as to extract APN information regarding an APN which is associated with the mobile device 10 and which has an unused remaining communication volume from fee management data stored in the fee management data storing units 213 and 213A in the first to third embodiments, alternatively, the APN information may be directly extracted from fee management data stored by the service control device (remaining communication volume storage device) 40.

In addition, while the mobile devices 10 and 10B are assumed to be prepaid mobile devices, the mobile devices need not be prepaid mobile devices and any mobile device may suffice as long as communication can be performed on a prepaid basis.

The first to third embodiments described above primarily use a GPRS-based communication system. However, the present invention is not limited thereto and is applicable to any communication system as long as communication can be performed using packet data including LTE (Long Term Evolution) and other new communication systems. In such cases, a P-GW (Packet Data Network Gateway) corresponds to the GGSN 30, and an MME (Mobility Management Entity) or an S-GW (Serving Gateway) corresponds to the SGSNs 20, 20A, and 20B. In addition, an HSS (Home Subscriber System) corresponds to the service control device 40. Moreover, a PCRF (Policy and Charging Rule Function) may be used as the service control device 40.

REFERENCE SIGNS LIST 1, 1A, 1B communication system
10, 10A, 10B mobile device
20, 20A, 20B SGSN (communication control device)
101B communication connecting unit (mobile device-side reconnecting means)
102 priority order storing unit (priority order storing means)
103 access point information transmitting unit (access point information transmitting means)
104 access point information acquiring unit (access point information acquiring means)
105 access point information selecting unit (access point information selecting means)
201, 201A access point information extracting unit (access point information extracting means)
202 access point information reporting unit (access point information reporting means)
203A inquiring unit (inquiring means)
204A connection result reporting unit (connection result reporting means)
205B reconnection information reporting unit (reconnection information reporting means)
211, 211A identification information acquiring unit (identification information acquiring means)
212, 212A fee management data acquiring unit (remaining communication volume acquiring means)
213, 213A fee management data storing unit (remaining communication volume storage device)
214 communication volume measuring unit (communication volume measuring means)

215 remaining communication volume calculating unit (remaining communication volume calculating means)

216, 216A communication feasibility determining unit (communication feasibility determining means)

217A communication connecting unit (communication connecting means)

217B communication connecting unit (reconnection information reporting means)

The invention claimed is:

1. A communication system configured to comprise: a communication control device which acquires, from a mobile device, access point information indicating an access point that is accessed when connecting to a communication network and which controls communication by the mobile device based on the access point information; and a memory configured to store a remaining communication volume that can be used by the mobile device to communicate through the access point indicated by the access point information in association with identification information capable of identifying a subscriber who uses the mobile device, wherein the communication control device includes first circuitry configured to:
acquire the identification information and the access point information from the mobile device;
acquire, based on the acquired identification information and the acquired access point information, a remaining communication volume of the mobile device, wherein the remaining communication volume is expressed as a remaining communication time during which communication can be performed or as a remaining data volume which can be communicated;
measure a communication volume from a start of communication by the mobile device;
calculate a remaining communication volume that can be used for communication by the mobile device based on the acquired remaining communication volume and the measured communication volume;
determine whether or not communication by the mobile device can be continued based on the calculated remaining communication volume;
extract access point information regarding an access point with an unused remaining communication volume when it is determined that communication by the mobile device cannot be continued; and
report the extracted access point information to the mobile device, and the mobile device includes second circuitry configured to:
acquire the access point information reported from the communication control device; and
transmit the acquired access point information to the communication control device upon initiating a communication connection to the communication network.

2. The communication system according to claim 1, wherein
the first circuitry is configured to:
extract a plurality of pieces of access point information; and
report the extracted plurality of pieces of access point information to the mobile device, and
the second circuitry is configured to:
select access point information that satisfies predetermined conditions from the acquired plurality of pieces of access point information; and
transmit the selected access point information to the communication control device.

3. The communication system according to claim 2, wherein the second circuitry is configured to:
store a plurality of pieces of access point information and a priority order applied when connecting to access points indicated by the respective pieces of access point information in association with each other; and
select access point information with a highest priority order among the acquired plurality of pieces of access point information based on the stored priority order.

4. The communication system according to claim 2, wherein
the first circuitry is configured to add a priority order to the extracted plurality of pieces of access point information and report the plurality of pieces of access point information added with the priority order to the mobile device; and
the second circuitry is configured to select access point information based on the priority order added to the access point information.

5. The communication system according to claim 2, wherein
the first circuitry is configured to add, to each of the extracted plurality of pieces of access point information, a remaining communication volume corresponding to each piece of access point information and report the plurality of pieces of access point information added with the remaining communication volumes to the mobile device; and
the second circuitry is configured to select access point information based on the remaining communication volumes added to the access point information.

6. The communication system according to claim 2, wherein
upon selection of access point information from the plurality of pieces of access point information, the second circuitry is configured to cause an application program that had initiated communication in the mobile device or a user of the mobile device to select the access point information.

7. A communication control device which acquires, from a mobile device, access point information indicating an access point that is accessed when connecting to a communication network and which controls communication by the mobile device based on the access point information, the communication control device comprising:
circuitry configured to
acquire, from the mobile device, identification information capable of identifying a subscriber who uses the mobile device and access point information;
acquire, based on the acquired identification information and the acquired access point information, a remaining communication volume that can be used by the mobile device, wherein the remaining communication volume is expressed as a remaining communication time during which communication can be performed or as a remaining data volume which can be communicated;
measure communication volume from a start of communication by the mobile device;
calculate a remaining communication volume that can be used for communication by the mobile device based on the acquired remaining communication volume and the measured communication volume;
determine whether or not communication by the mobile device can be continued based on the calculated remaining communication volume;

extract access point information regarding an access point with an unused remaining communication volume when it is determined that communication by the mobile device cannot be continued; and report the extracted access point information to the mobile device.

8. A communication method that is executed by a communication system configured to include: a communication control device which acquires, from a mobile device, access point information indicating an access point that is accessed when connecting to a communication network and which controls communication by the mobile device based on the access point information; and a memory configured to store a remaining communication volume that can be used by the mobile device to communicate through the access point indicated by the access point information in association with identification information capable of identifying a subscriber who uses the mobile device, the communication method comprising:

acquiring, by the communication control device, the identification information and the access point information from the mobile device;

acquiring, by the communication control device, based on the acquired identification information and the acquired access point information, a remaining communication volume of the mobile device, wherein the remaining communication volume is expressed as a remaining communication time during which communication can be performed or as a remaining data volume which can be communicated;

measuring, by the communication control device, a communication volume from a start of communication by the mobile device;

calculating, by the communication control device, a remaining communication volume that can be used for communication by the mobile device based on the acquired remaining communication volume and the measured communication volume;

determining, by the communication control device, whether or not communication by the mobile device can be continued based on the calculated remaining communication volume;

extracting, by the communication control device, access point information regarding an access point with an unused remaining communication volume when it is determined that communication by the mobile device cannot be continued;

reporting, by the communication control device, the extracted access point information to the mobile device;

acquiring, by the mobile device, the access point information reported from the communication control device; and transmitting, by the mobile device, the acquired access point information acquired to the communication control device upon initiating a communication connection to the communication network.

9. A communication system configured to comprise a communication control device which acquires, from a mobile device, access point information indicating an access point that is accessed when connecting to a communication network and which controls communication by the mobile device based on the access point information; and a memory configured to store a remaining communication volume that can be used by the mobile device to communicate through the access point indicated by the access point information in association with identification information capable of identifying a subscriber who uses the mobile device, wherein the communication control device includes circuitry configured to:

acquire the identification information and the access point information from the mobile device having made an initiation request for a communication connection;

acquire, based on the acquired identification information and the acquired access point information, a remaining communication volume of the mobile device, wherein the remaining communication volume is expressed as a remaining communication time during which communication can be performed or as a remaining data volume which can be communicated;

determine whether or not a communication connection by the mobile device can be performed based on the acquired remaining communication volume;

extract access point information regarding an access point with an unused remaining communication volume when it is determined that the communication connection by the mobile device cannot be performed; and initiate a communication connection of the mobile device based on the extracted access point information.

10. The communication system according to claim 9, wherein the circuitry is configured to:

make an inquiry to a user of the mobile device regarding whether or not a connection may be performed to the access point indicated by the extracted access point information; and connect the mobile device to the access point based on a result of the inquiry.

11. The communication system according to claim 9, wherein the circuitry is configured to report access point information which indicates the access point to which the mobile device has been connected to the mobile device.

12. A communication control device which acquires, from a mobile device, access point information indicating an access point that is accessed when connecting to a communication network and which controls communication by the mobile device based on the access point information, the communication control device comprising:

circuitry configured to acquire identification information capable of identifying a subscriber who uses the mobile device and access point information from the mobile device having made an initiation request for a communication connection;

acquire, based on the acquired identification information and the acquired access point information, a remaining communication volume which can be used by the mobile device to communicate through the access point indicated by the access point information, wherein the remaining communication volume is expressed as a remaining communication time during which communication can be performed or as a remaining data volume which can be communicated;

determine whether or not a communication connection by the mobile device can be performed based on the acquired remaining communication volume;

extract access point information regarding an access point with an unused remaining communication volume when it is determined that the communication connection by the mobile device cannot be performed; and initiates a communication connection of the mobile device based on the extracted access point information.

13. A communication method that is executed by a communication system configured to include: a communication control device which acquires, from a mobile device, access point information indicating an access point that is accessed when connecting to a communication network and which controls communication by the mobile device based on the access point information; and a memory configured to store a remaining communication volume that can be used by the mobile device to communicate through the access point indicated by the access point information in association with identification information capable of identifying a subscriber who uses the mobile device, the communication method comprising:

acquiring, by the communication control device, the identification information and the access point information from the mobile device having made an initiation request for a communication connection;

acquiring, by the communication control device, based on the acquired identification information and the acquired access point information a remaining communication volume of the mobile device, wherein the remaining communication volume is expressed as a remaining communication time during which communication can be performed or as a remaining data volume which can be communicated;

determining, by the communication control device, whether or not a communication connection by the mobile device can be performed based on the acquired remaining communication volume;

extracting, by the communication control device, access point information regarding an access point with an unused remaining communication volume when it is determined that the communication connection by the mobile device cannot be performed; and initiating, by the communication control device, a communication connection of the mobile device based on the extracted access point information.

14. A communication system configured to comprise: a communication control device which acquires, from a mobile device, access point information indicating an access point that is accessed when connecting to a communication network and which controls communication by the mobile device based on the access point information; and a memory configured to store a remaining communication volume that can be used by the mobile device to communicate through the access point indicated by the access point information in association with identification information capable of identifying a subscriber who uses the mobile device, wherein the communication control device includes circuitry configured to:

acquire the identification information and the access point information from the mobile device;

acquire, based on the acquired identification information and the acquired access point information, a remaining communication volume of the mobile device, wherein the remaining communication volume is expressed as a remaining communication time during which communication can be performed or as a remaining data volume which can be communicated;

measure a communication volume from a start of communication by the mobile device;

calculate a remaining communication volume that can be used for communication by the mobile device based on the acquired remaining communication volume and the measured communication volume;

determine whether or not communication by the mobile device can be continued based on the calculated remaining communication volume;

extract access point information regarding an access point with an unused remaining communication volume when it is determined that communication by the mobile device cannot be continued; and control communication by the mobile device based on the extracted access point information.

15. The communication system according to claim 14, wherein the circuitry is configured to report the extracted access point information to the mobile device, and the mobile device is configured to perform a communication connection based on the access point information reported from the communication control device.

16. A communication control device which acquires, from a mobile device, access point information indicating an access point that is accessed when connecting to a communication network and which controls communication by the mobile device based on the access point information, the communication control device comprising:

circuitry configured to:

acquire, from the mobile device, identification information capable of identifying a subscriber who uses the mobile device and access point information;

acquire, based on the acquired identification information and the acquired access point information, a remaining communication volume that can be used by the mobile device to communicate through the access point indicated by the access point information, wherein the remaining communication volume is expressed as a remaining communication time during which communication can be performed or as a remaining data volume which can be communicated;

measure a communication volume from a start of communication by the mobile device;

calculate a remaining communication volume that can be used for communication by the mobile device based on the acquired remaining communication volume and the measured communication volume;

determine whether or not communication by the mobile device can be continued based on the calculated remaining communication volume;

extract access point information regarding an access point with an unused remaining communication volume when it is determined that communication by the mobile device cannot be continued; and control communication by the mobile device based on the extracted access point information.

17. A communication method that is executed by a communication system configured to include: a communication control device which acquires, from a mobile device, access point information indicating an access point that is accessed when connecting to a communication network and which controls communication by the mobile device based on the access point information; and a memory configured to store a remaining communication volume that can be used by the mobile device to communicate through the access point indicated by the access point information in association with identification information capable of identifying a subscriber who uses the mobile device, the communication method comprising:

acquiring, by the communication control device, the identification information and the access point information from the mobile device;

acquiring, by the communication control device, based on the acquired identification information and the acquired access point information, a remaining communication volume of the mobile device, wherein the remaining communication volume is expressed as a remaining communication time during which communication can be performed or as a remaining data volume which can be communicated;

measuring, by the communication control device, a communication volume from a start of communication by the mobile device;

calculating, by the communication control device, a remaining communication volume that can be used for communication by the mobile device based on the acquired remaining communication volume and the measured communication volume;

determining, by the communication control device, whether or not communication by the mobile device can be continued based on the calculated remaining communication volume;

extracting, by the communication control device, access point information regarding an access point with an unused remaining communication volume when it is determined that communication by the mobile device cannot be continued; and controlling, by the communication control device, communication by the mobile device based on the extracted access point information.

* * * * *